(12) United States Patent
Fong et al.

(10) Patent No.: US 6,345,287 B1
(45) Date of Patent: *Feb. 5, 2002

(54) GANG SCHEDULING FOR RESOURCE ALLOCATION IN A CLUSTER COMPUTING ENVIRONMENT

(75) Inventors: Liana Liyow Fong, Irvington, NY (US); Ajei Sarat Gopal, Fort Lee, NJ (US); Nayeem Islam, Thornwood, NY (US); Andreas Leonidas Prodromidis, New York, NY (US); Mark Steven Squillante, Pound Ridge, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,713

(22) Filed: Nov. 26, 1997

(51) Int. Cl.[7] .................................................. G06F 9/46
(52) U.S. Cl. ....................................... 709/102; 709/104
(58) Field of Search ........................... 709/1, 100, 102, 709/104, 108, 106; 711/173; 707/8, 9

(56) References Cited

U.S. PATENT DOCUMENTS 5,269,020 A * 12/1993 Kakimoto ...................... 707/8
5,325,526 A * 6/1994 Cameron et al. ............ 709/102
5,694,604 A * 12/1997 Reiffin ......................... 709/107

OTHER PUBLICATIONS

Franke et al. "Gang Scheduling for Highly Efficient Distributed Multiprocessor Systems" pp 4–12—IEEE 1996.*

Islam et al. "Extensible Resource Management for Cluster Computing" pp 561–568—IEEE May 1997.*

* cited by examiner

Primary Examiner—Majid A. Banankhah
(74) Attorney, Agent, or Firm—Wayne L. Ellenbogen; Anne Vachon Dougherty

(57) ABSTRACT

A system and method whereby a gang scheduling entity assembles a schedule of application tasks to be run on a plurality of distributed parallel processors for pre-set time intervals. The scheduling information, including an ordered set of applications and the length of the time interval, are provided to each of the node level schedulers for the relevant processors, and the node level schedulers assure that the tasks of the applications are executed, with context switching between tasks being controlled at the node level. Tasks from multiple applications can be scheduled simultaneously, with time sharing and space sharing being utilized in the schedule. The inventive system is dynamically scalable, with the gang scheduling entity restructuring the matrix schedule should dynamic re-partitioning result in addition or deletion of processors.

16 Claims, 4 Drawing Sheets

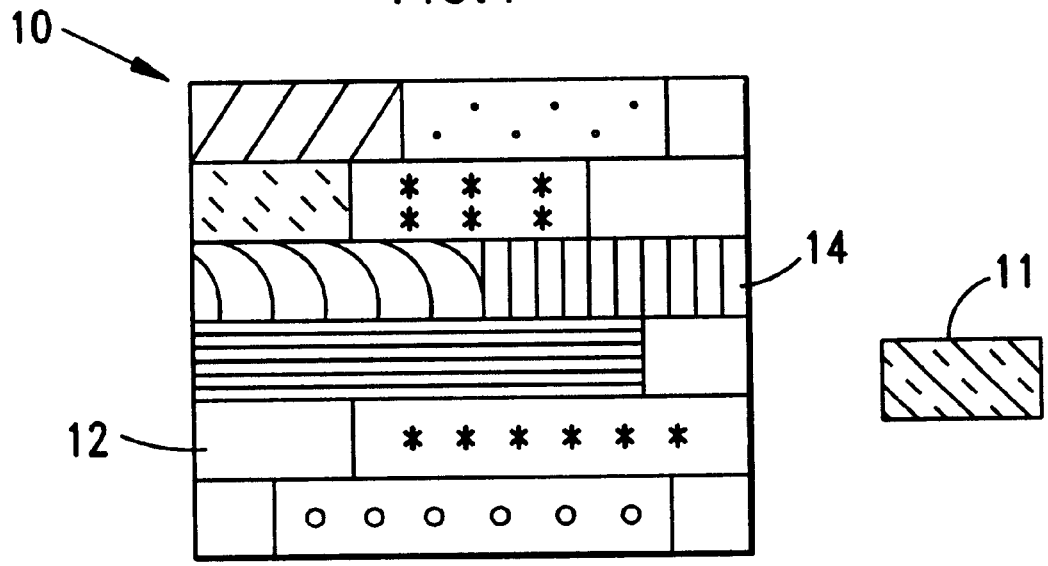
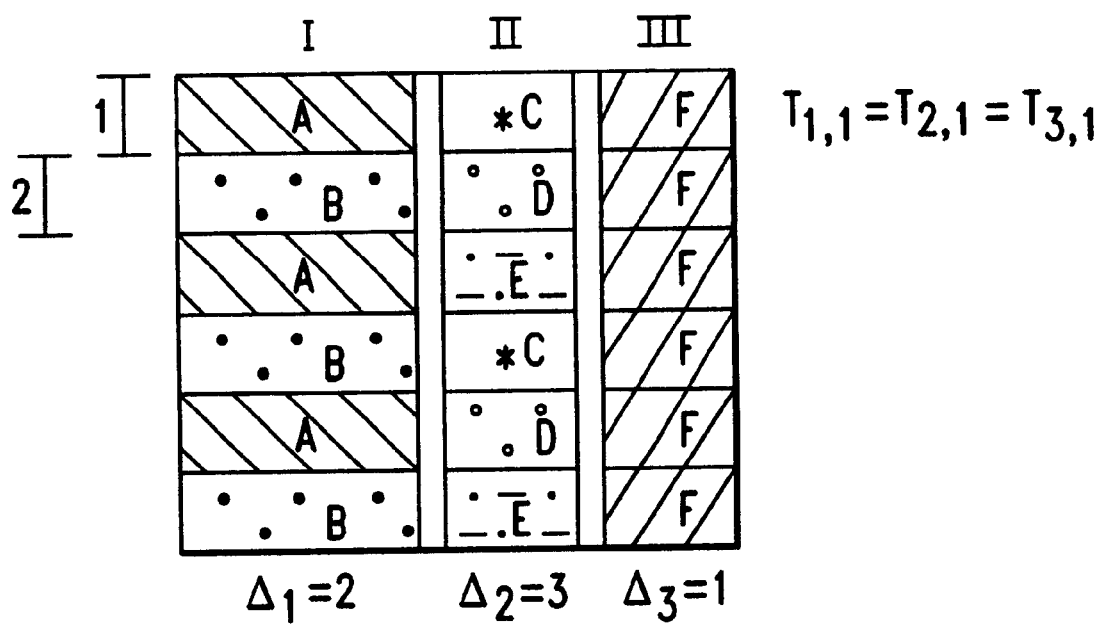

FIG.5

| J | | |
|---|---|---|
| G | P | V |
| H | Q | V |
| I | R | V |

GANG SCHEDULING FOR RESOURCE ALLOCATION IN A CLUSTER COMPUTING ENVIRONMENT

FIELD OF THE INVENTION

This invention relates to scheduling of resources in a cluster computing environment. More specifically, it relates to providing a general and scalable gang scheduling methodology having time-sharing and space-sharing components integrated together to optimize system/application performance for running reconfigurable applications across distributed systems.

BACKGROUND OF THE INVENTION

Allocation of computer resources to parallel-running tasks is a challenge for systems of all sizes. In a massively parallel processing system, as well as in a network of computers, a relatively large number of separate processing elements are interconnected to simultaneously process a large number of tasks at speeds far exceeding those of conventional computers. However, to perform parallel operations efficiently, it is necessary to have the capability of allocating the resources among different tasks as needed.

Carving out or allocating parts of the system to run tasks without interfering with each other is commonly referred to as "space sharing" or "partitioning." Partitioning, in general, is the ability to divide up system resources into groups in order to facilitate particular management functions. The structure of massively distributed parallel processing systems provides the opportunity to partition the system into groups of nodes for various purposes.

The resource requirements for each parallel scientific or commercial application may be vastly different from each other. Furthermore, the communication and synchronization traits among the constituent tasks of different parallel applications can be equally diverse, from the one extreme, consisting of fine-grained tasks that require frequent communication and synchronization among tasks within an application, to the other extreme, comprising coarse-grained tasks which operate independently. Therefore, parallel computers, such as the IBM RISC System/6000 Scalable Power Parallel System family, must support a wide variety of parallel applications, each with its own unique resource requirements. As a specific example, the interaction, synchronization, and communication among tasks within fine-grained applications typically require the simultaneous allocation of their tasks on computing nodes; whereas, the independent tasks of coarse-grained applications do not require simultaneous resource allocation. Both types of applications are scheduled (i.e., allocated) based upon system status, workload characteristics, and application characteristics, such as the number of tasks to be performed for the application, the execution time, required disk space, etc.

In order to perform efficient scheduling of resources, several scheduling methods have been devised for managing the execution of parallel applications. The first is a "space sharing" scheduling method under which the nodes are partitioned among different parallel jobs. Several space sharing strategies have been proposed in the past. Static partitioning of dedicated nodes has been utilized in production systems, given the low system overhead and simplicity from both the system and application perspectives. Static space sharing of nodes can, however, lead to low system throughputs and poor resource utilization under nonuniform workloads. System performance can be improved by adaptively determining the number of nodes allocated to a job based on the system state at the time at which the job arrives, and adaptively determining the number of nodes allocated to a set of waiting jobs when a job departs. The performance benefits of adaptive partitioning can be somewhat limited and such a system generally cannot respond to subsequent workload changes.

Another scheme, so-called dynamic space sharing, partitions and re-partitions resources upon all entries and exits of applications, as well as throughout their execution. Such a scheme can maintain very efficient resource utilizations. However, if the frequency of re-partitioning is not controlled, the associated overhead can limit, and even eliminate, the potential benefits.

Another scheduling scheme is "time sharing" wherein the nodes are rotated among a set of jobs, each executing for a specified amount of time, thereby ensuring that all jobs gain access to the system resources within a relatively short period of time. Time sharing can be effective for tasks with mixed processing requirements, but may not be particularly suitable for applications with large data sets if the frequency of rotation is high.

What is desirable is a system and method for providing gang scheduling which realizes the benefits of both dynamic space sharing and time sharing across distributed computer systems.

The article "Scheduling Techniques for Concurrent Systems" by John Ousterhout, *Proceedings of the Third International Conference on Distributed Computing Systems*, pp. 22–30 (October 1982), details one gang scheduling approach wherein slots of time on all available processors are arranged in a matrix as illustrated in FIG. 1. An incoming job, such as 11, is plugged into the matrix/schedule, 10, wherever sufficient time was available, slot 12. Under the Ousterhout scheduling scheme, there is no subpartition of the matrix such that additions and deletions of processors to the matrix, or additions or terminations of jobs, may affect every node column in the matrix. In addition, central control and requisite global transmission of changes are utilized; and cancellation of a job may result in fragmentation (i.e., open time slots) with underutilized processor time (e.g., cancellation of job, 14, will leave the time slot empty and the processor(s) underutilized).

It is therefore an objective of the present invention to provide a general and scalable gang scheduling methodology with a decentralized approach for implementation on distributed computer systems.

It is yet another objective of the present invention to provide a gang scheduling methodology which adaptively allocates resources to tasks, or gang members, in the manner of dynamic space sharing.

It is also an objective of the present invention to provide a decentralized method to perform coordinated context switching of gang members using local logical clock mechanisms.

In addition to providing a gang scheduling mechanism for a distributed system, it is an objective of the present invention to provide gang scheduling in partitions which can undergo dynamic re-partitioning in accordance with the FDP mechanism set forth in the present authors co-pending application entitled "Flexible Dynamic Partitioning of Resources in a Cluster Computing Environment," Ser. No. 08/862,454, filed May 27, 1997, and assigned to the present assignee, the teachings of which are hereby expressly incorporated by reference.

It is additionally an objective that the scheduling method be applicable to all computer environments, including shared-memory and distributed-memory systems, scientific and commercial workload environments, and loosely-coupled and tightly-coupled parallel architectures.

SUMMARY OF THE INVENTION

The invention provides a general and flexible system and method whereby a gang scheduling entity assembles a schedule for application tasks to be run on a plurality of distributed parallel processors. The scheduling information, including at least a mapping of applications to processors, and potentially an ordered set or sub-schedule of tasks to be run and the length of the time slices for context switching, are provided to each of the lower level schedulers for the relevant processors by a higher level scheduler, and the lower level schedulers assure that the tasks are executed. When a detailed sub-schedule of tasks is provided by the higher level scheduler, the lower level schedulers assure that the tasks execute in the preset order in accordance with the subschedule, with context switching between tasks being controlled at the decentralized node level. When only a mapping of applications to processors is provided by the higher level scheduler, there is additional flexibility and generality by allowing the lower level schedulers to make all or any subset of the scheduling decisions. Tasks from multiple applications can be scheduled simultaneously, integrating both time sharing and space sharing schemes in the schedule. The inventive system is dynamically reconfigurable in the event of addition or deletion of processors in the gang scheduling partition. It is also dynamically reconfigurable into subpartitions in response to changing application requirements which may result in reassignment of processors among groups of applications.

BRIEF DESCRIPTION OF THE DRAWINGS

The invention will now be described in further detail with specific reference to the accompanying figures wherein:

FIG. 1 illustrates the Ousterhout time sharing scheduling matrix of the prior art.

FIG. 4 provides a specific implementation of a gang scheduling matrix in accordance with the present invention.

FIG. 5 illustrates an alternative matrix implementation in accordance with the present invention.

DESCRIPTION OF THE PREFERRED EMBODIMENT

Under the inventive gang scheduling, components or tasks of parallel jobs (collectively referred to as a "gang") execute at the same time, with each of the tasks (or gang members) executing on different processors. All of the gang members are scheduled at the same time and execute in parallel for a pre-set time interval, also known as the time slice. Upon expiration of the pre-set time slice scheduled for a given gang, a gang switch occurs during which all of the tasks/gang members that were executing are suspended, or de-scheduled, and waiting tasks for another gang are scheduled. While all tasks of a single gang are scheduled and de-scheduled at the same time, it is also possible to have more than one gang simultaneously scheduled and executing side-by-side in a space sharing manner, if the tasks of each of the scheduled gangs do not require usage of all of the available processors in a partition.

Under the inventive gang scheduling method, the resource management system at the partition level dictates the degree of space-sharing (i.e., the number of subpartitions), the degree of time-sharing for each subpartition (i.e., the number of jobs to be executed on the subpartition in a time-sharing manner), and the set of tasks to be executed on the nodes of each subpartition. This division of the available resources in space and time, and the mapping of jobs to these resources, is defined by a generalized gang scheduling matrix (further discussed below). All of the tasks, or gang members, in a given set of columns of the matrix share the subpartition of nodes represented by the columns. For each subpartition, all of the tasks, or gang members, in a given row of the matrix are scheduled to share the available space for the designated time slice; after which time, the nodes in the subpartition will context switch simultaneously to another gang of tasks or other gangs of tasks. When re-partitioning is required, it can be conducted simultaneously with the context switch in order to allow the system to accommodate varying workloads.

Figure 2:
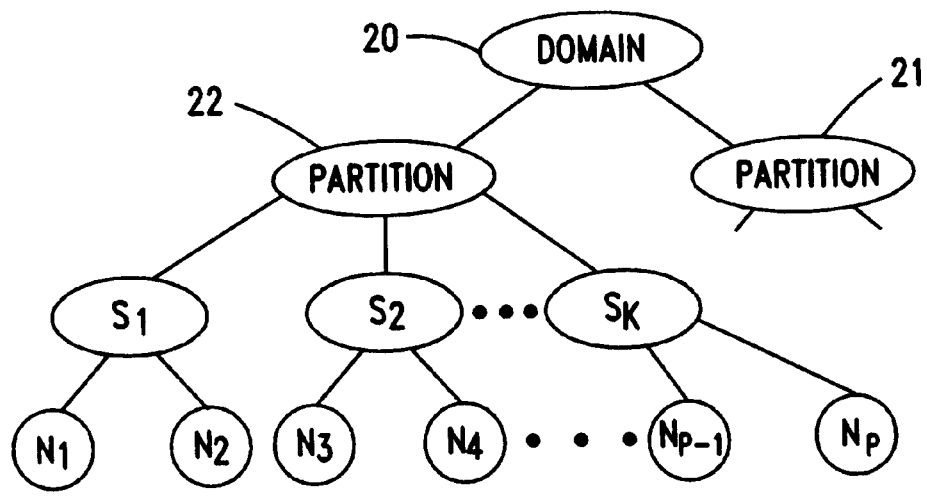
FIG. 2 schematically illustrates a hierarchical relation of subpartitions $S_1$ through $S_K$ in partition GS, having nodes $N_1$ through $N_p$ associated therewith.

FIG. 2 provides a schematic illustration of a partition, under domain 20 having partitions 21 and 22, which could utilize the gang scheduling of the present invention. The partition 22 may be divided into a plurality of K subpartitions, $S_1$ through $S_K$, which are in turn comprised of a plurality of nodes, $N_1$ through $N_p$. Although the illustrated system provides for two nodes per subpartition, clearly any supportable number of nodes may comprise a subpartition, and that number may change due to the dynamic re-partitioning taught by the aforementioned co-pending application. In addition, above the partition level, there would be one or more control levels, for example having a global scheduling entity. However, under the present invention, any global scheduling entity would simply pass applications to the partition level scheduler and would not be instrumental in the implementation of scheduling. Where prior art gang scheduling systems and methods provided centralized scheduling and control, requiring centralized hardware-based control, and/or tightly-coupled partitions, under the gang scheduling of the present invention, local partition-level scheduling is implemented across nodes of loosely-coupled subpartitions, which may be dynamically re-defined under the FDP mechanism.

The resource management control system, or partition level gang scheduler, determines which nodes will be executing tasks of which waiting applications and communicates that information to each node. In the most general case, the gang scheduler defines a matrix which is a mapping of sets of applications to sets of processors. Once that mapping information is communicated to the nodes of the subpartition, the order and time slicing (including the sub-schedule details described below) are performed by the subpartition level scheduler. In an alternative embodiment, the gang scheduler will predetermine not only the general schedule comprising the application-to-processor mapping, but also the so-called sub-schedule information including, but not limited to, the order in which jobs are executed, the time slice length for each application on each partition, and the scheduling of some jobs multiple times for alternate execution with other jobs, if necessary. Clearly, various intermediate levels of sub-scheduling, having some but not all of the aforementioned information, may be provided by the gang scheduler.

In accordance with the invention, each node has its own node level scheduling function for managing its own single-node subpartition and for implementing the information assigned to it by the partition level gang scheduler. The node level scheduler implements the scheduling policy and system attributes set by its gang scheduler. For example, the node level scheduler inserts tasks into its local dispatcher queue in coordination with the other node level schedulers in the subpartition. Each node independently time slices among jobs allocated to it according to its local logical time, for the time interval dictated by the aforementioned sub-schedule information defined by higher levels of the gang scheduler. Rather than centrally-orchestrated simultaneous multi-node context switching, each node switches independently based upon its local logical clock, which is synchronized to maintain consistent time across the nodes. Synchronized local logical clocks are implemented in accordance with known methods (see: e.g., "Network Time Protocol (v.3) Specification, Implementation and Analysis," by D. Mills, University of Delaware technical report RFC 1305, March 1992).

Figure 3:
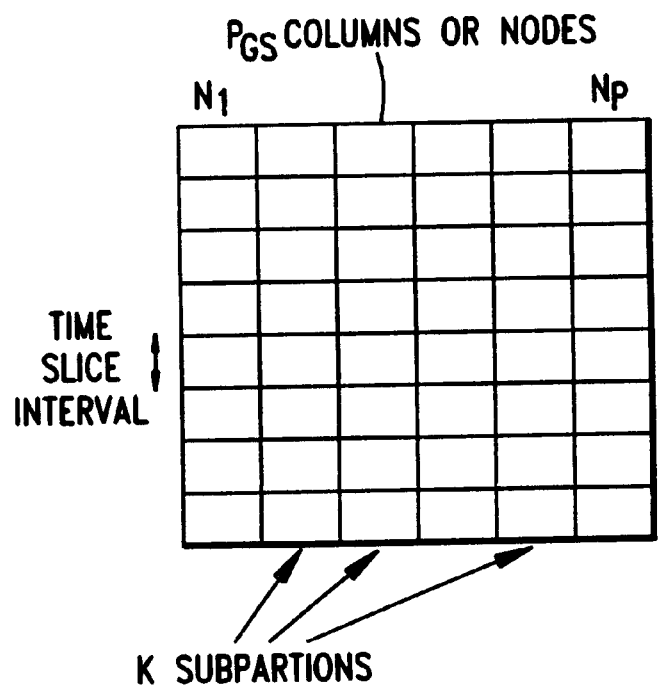
FIG. 3 provides a general global scheduling matrix utilized in the present invention.

FIG. 3 illustrates a general gang scheduling matrix compiled by the gang scheduler and provided to the local scheduling entities of the present invention. As illustrated, each column in the matrix represents one node and each row of the matrix represents the degree of time-sharing. $P_{GS}$ is the number of nodes that are available for gang scheduling. The $P_{GS}$ columns are divided into K disjoint subpartitions or groups. The number of columns in the $k^{th}$ subpartition represents the number of nodes allocated to the parallel applications assigned to that subpartition, and the number of rows for the $k^{th}$ partition represents its degree of time-sharing $\Delta_k$, where $1 \leq k \leq K$. Each row in the global matrix represents the mapping of a set of applications to a set of subpartitions, wherein each application is mapped to only one subpartition. The number and sizes of time slices for each subpartition can be different and independent of those in the other subpartitions (i.e., for different applications being mapped and scheduled), which provides additional flexibility to optimize various performance objectives. The system administrator establishes the time slice or can set minimum and maximum time slice lengths, thereby allowing the gang scheduler to dynamically adjust within the time boundaries. Moreover, for each time slice allocated to larger job classes or gangs, the present inventive method, as discussed above, supports the allocation of multiple time slices to smaller job classes, such that smaller jobs can be placed in multiple rows of a subpartition of the matrix, to reduce overall mean response times.

FIG. 4 provides a more detailed illustration of one form of the gang scheduling matrix, wherein the gang scheduler determines not only the assignment of applications to processors but also pre-determines the actual sub-schedule (including job ordering, time slicing, etc.) for execution at the subpartitions in accordance with the present invention. In the illustrated example, a plurality of processors are scheduled to execute jobs A–F in accordance with the matrix schedule. Each set of one or more nodes is assigned a sub-schedule including at least one set of tasks, comprising tasks of one or more applications, and the time slice length for running each task. The time slice for each row of the $k^{th}$ subpartition is denoted by $T_{k,i}$, where $1 \leq i \leq \Delta_k$, $1 \leq k \leq K$. Looking across the rows of the matrix, one sees that at time slice 1, tasks of applications A, C and F are executing on different processors. At the end of time slice 1, each node automatically performs a local context switch and tasks of applications B, D and F begin executing for the duration of time slice 2.

The one or more nodes represented in Column I effectively time share between jobs of applications A and B, wherein A executes for a first time slice followed by B executing for a next time slice, with the time cycle repeating between tasks of the two applications (i.e., a time-sharing degree of two). Simultaneously, the one or more processors represented in Column II are time-sharing jobs of applications C, D and E, switching among tasks at the expiration of the time slice according to the time-sharing degree of three. Lastly, the one or more processors represented in Column III switch at the end of each time slice among tasks of single application F, effectively providing space sharing with respect to the other subpartitions. The matrix allows the gang scheduler to combine both time sharing and space sharing across the available processors. Moreover, the matrix is readily restructured to add or release nodes as needed for re-partitioning.

Changes to the schedule are localized under the present invention so that addition or subtraction of applications can be readily implemented without affecting all of the distributed system's processors. For example, if application D in FIG. 4 terminates (due to completion or cancellation), the gang scheduler can rearrange the sub-schedule for the nodes in Column II without altering the sub-schedules for any of the nodes represented in Columns I and III. All nodes inform the gang scheduler upon completion of tasks of an application so that the gang scheduler can insert new or waiting tasks into the sub-schedule for the available processor(s), if the tasks are appropriate in terms of "size" and node requirements.

Figure 5:
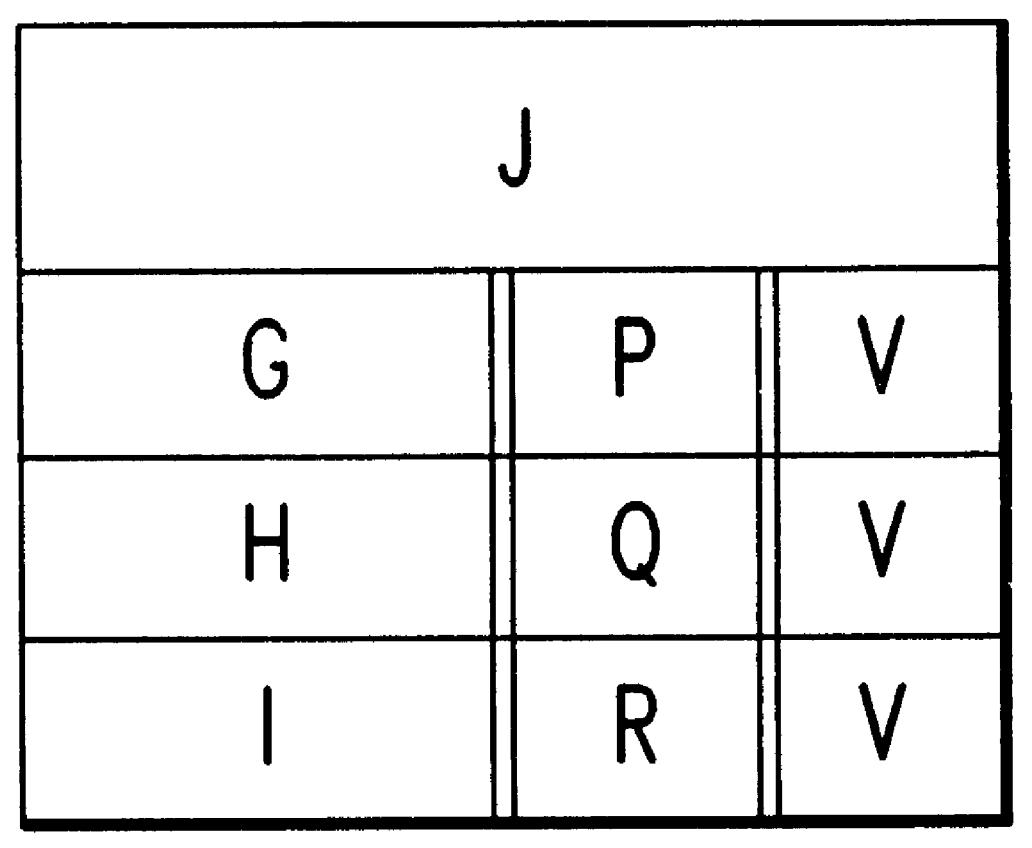

The inventive gang scheduling method also supports applications that require all of the nodes available in the partition, as well as applications that require a partition much larger than the existing subpartitions, while other applications execute in subpartitions of various sizes. FIG. 5 illustrates the general approach to handling the foregoing combination of applications with the structure of the gang scheduling matrix. The application J runs on all nodes during a particular time slice, and other applications (G–I, P–R and V) run on the nodes in their respective subpartitions during other time slices. In such a scheme, the degree of time-sharing will be more restrictive. However, the flexibility and independence of the subpartitions continue, with the exception that all subpartitions must switch to job J at the same time. For example, jobs G-H-I and P-Q-R can be executed multiple times in between executions of job J.

Beyond rescheduling by insertion of jobs anywhere in the existing matrix, the gang scheduler can completely restructure the matrix should addition or release of nodes be warranted based upon re-partitioning (cf: the aforementioned co-pending application). If, for example, more nodes from other partitions become available for the gang partition, the gang scheduler will inform the managers of the affected reconfigurable applications of the potential change to a subpartition. A reconfigurable application can, within its own defined limits, tailor its tasks to the number of available processors and will notify the gang scheduler of its task reconfiguration. If the available nodes can be utilized based upon reconfiguration of the application(s), then the nodes will be added and a new matrix created. Similarly, if another partition requests nodes, and the reconfigurable application informs the gang scheduler that it can run on fewer nodes, then nodes may be released to a requesting partition, and a new matrix created.

For addition or deletion of nodes, the selection of subpartitions is evaluated according to criteria defined by the system administrator, as described in the aforementioned co-pending patent application. For example, the controlling criterion may be: to affect the least number of applications (e.g., Column III); to affect the column/matrix areas having the most nodes allocated to it (e.g., Column I), a consideration which is particularly relevant for release of nodes to other subpartitions; or, to affect the column in which the processors are least utilized (e.g., the space sharing nodes of Column III).

Additional parameters may influence gang scheduling as conducted by the partition level scheduler. To determine resource availability, the scheduler will, at least, check for subpartitions having sizes that match the requirements of the new job and the degree or level of time-sharing. In addition, the scheduler will consider the smoothing interval (i.e., minimum interval for invoking dynamic re-partitioning in a gang scheduling system), the time interval between resource monitoring updates, and the minimum and maximum partition or subpartition sizes.

In summary, the partition level scheduler can increase the value of $\Delta_k$, which is the level or degree of time-sharing, in response to rising load conditions. The degree of time-sharing is subject, of course, to memory constraints, workload efficiency, the variability of workload service demands, and the current load/utilization of the system. When a job in the $k^{th}$ subpartition departs, the partition level gang scheduler assigns a waiting job to that subpartition and the level of $\Delta_k$ remains the same. If, however, there are no waiting jobs, the value of $\Delta_k$ will be decremented. It is to be noted that where $\Delta_k=1$, the gang scheduling is effectively reduced to a space sharing scheduling scheme. Where $\Delta_k>1$, time sharing is in effect. Furthermore, when K=1, clearly the gang scheduling partition reduces to a pure time sharing partition.

By utilizing gang scheduling at the partition level, not only does one realize the benefits of the hybrid space and time sharing scheduling schemes, but also the additional advantage that re-partitioning is not required as often as would otherwise have been expected when using pure time sharing or pure space sharing scheduling. The "natural" draining of the columns due to departures of jobs and the consequence that re-partitioning is conducted for each subpartition in parallel, together contribute to a streamlining of the re-partitioning process when the inventive gang scheduling is implemented. Since re-partitioning will require recomputation, or restructuring, of the gang scheduling matrix, it is advantageous to provide a smoothing interval between re-partitioning steps, as is taught in the prior application.

Figure 6:
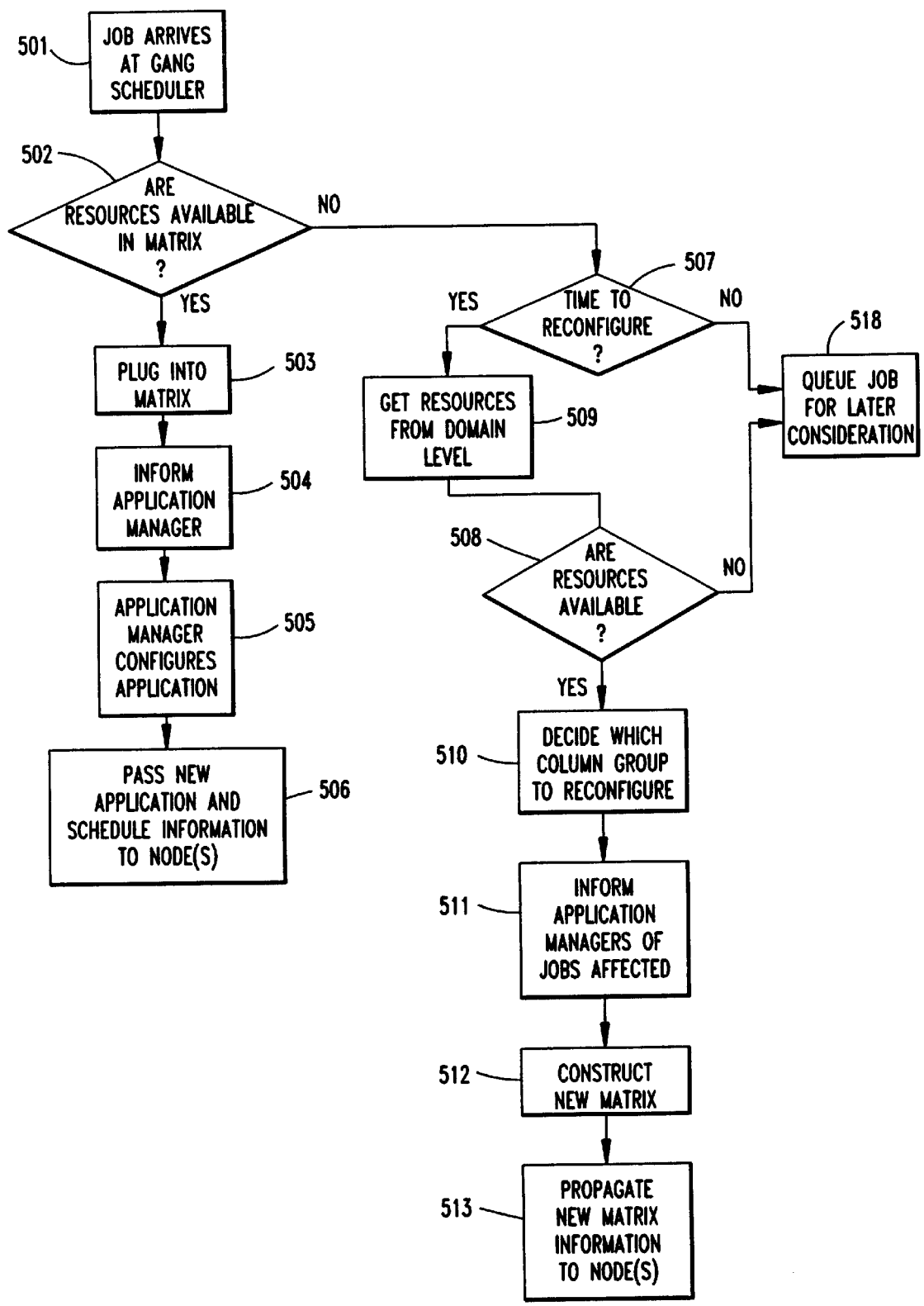
FIG. 6 provides a process flow illustrative of the methods implemented in accordance with the present invention.

FIG. 6 details a representative process flow followed in accordance with the present invention. Upon arrival of a job at the gang scheduler, step 501, it is first determined if resources are presently available in the matrix schedule to accommodate the new job, at step 502. As noted above, determination of resource availability involves checking for subpartitions of sizes that match the requirements of the new job, analyzing the degree of time-sharing, and considering re-partitioning of the subpartitions. If resources are available, the job is plugged into the matrix, at 503, and the application manager is informed of the column group to which the job has been assigned, at 504. In response, the application manager configures the application accordingly, at 505, and the new application and sub-schedule information are provided to the node level scheduler of the assigned subpartition at 506.

If insufficient resources exist in the present matrix (i.e., a "no" determination at box 502), then the system asks, at 507, whether it is time to reconfigure, in accordance with the smoothing interval and possibly other event triggers, incorporated into the flexible dynamic partitioning. If it is not time, the work would be queued, at 518, for later consideration. If it is time, the gang scheduler will go to the domain level scheduler, at 509, to request more resources. If no resources are made available by the domain level scheduler, again the job is queued for later consideration. When the domain level scheduler does provide available resources, the system administrator-defined criteria are invoked, at step 510, to decide how to restructure the matrix to include the added resources. The affected application managers will be notified about the changes. Once the application managers respond back to the gang scheduler, the new matrix is placed in effect and the new job is inserted into the matrix, at 512, and propagated to the node level schedulers of the affected partition(s), at 513. Clearly one with skill in the art will recognize that the process flow could be modified without departing from the necessary functionality which comprises the subject inventive method.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. In a computer environment comprising a plurality of nodes, each of said nodes having at least one processor and a local logical clock, a resource scheduling system for allocation of processor resources among parallel applications comprising:

a gang scheduler for flexibly establishing a schedule comprising a plurality of sub-schedules of node-specific tasks of said parallel applications to be performed at each of said plurality of nodes, for communicating only node-specific task information derived from one of said plurality of sub-schedules to each of said plurality of nodes and for dynamically altering the schedule to optimize task performance at run time; and a plurality of node level schedulers each adapted to receive the node-specific task information from one of said plurality of sub-schedules and to implement said node-specific tasks of the sub-schedule at said node using said local logical clock.

2. In a computer environment comprising a plurality of nodes, each of said nodes having at least one processor and a local logical clock, a resource scheduling system for allocation of processor resources among parallel applications comprising:

a gang scheduler for flexibly establishing a schedule comprising a mapping of said applications to said plurality of nodes, for communicating only node-specific mapping information to each of said plurality of nodes and for dynamically altering the schedule to optimize task performance at run time; and a plurality of node level schedulers each adapted to receive said node-specific mapping information and to execute a schedule of applications at said node using said local logical clock.

3. A method for providing processor resource allocation among tasks of parallel applications in a computer environment having a gang scheduler and a plurality of nodes each having at least one processor, a local logical clock, and a node level scheduler comprising the steps of:

receiving application requirement information at said gang scheduler;

utilizing said application requirement information for flexibly creating a schedule at said gang scheduler, said schedule comprising a plurality of sub-schedules of node-specific task information for each of said plurality of nodes;

transmitting only said node-specific task information to each of said plurality of sub-schedules, one to each of said plurality of nodes; and implementing said sub-schedules at said plurality of nodes.

4. The method of claim 3 wherein said schedule includes at least one time slice for performing each task of said schedule; and wherein each node level scheduler switches to other tasks on said sub-schedule at the end of said time slice.

5. The method of claim 4 wherein each of said plurality of node level schedulers monitors its own local logical clock to determine the end of said time slice.

6. The method of claim 3 further comprising dynamically updating said schedule in response to a request for release of resources.

7. The method of claim 3 further comprising dynamically updating said schedule when more resources become available.

8. The method of claim 3 further comprising dynamically updating at least one of said plurality of sub-schedules when tasks are completed.

9. The method of claim 3 further comprising dynamically updating at least one of said plurality of sub-schedules when scheduling of more application tasks is needed.

10. A method for providing processor resource allocation among tasks of parallel applications in a computer environment having a gang scheduler and a plurality of nodes each having at least one processor, a local logical clock, and a node level scheduler comprising the steps of:

receiving application information at said gang scheduler;

flexibly creating a schedule at said gang scheduler, said schedule comprising a mapping of node-specific tasks of said applications to said plurality of nodes and for communicating only node-specific task information of said mapping to each of said plurality of nodes;

receiving said node-specific task information of said mapping at each of said plurality of nodes;

establishing, at each of said plurality of nodes, a sub-schedule for executing said node-specific tasks of said mapped applications; and executing said sub-schedule at each of said plurality of nodes.

11. The method of claim 10 further comprising dynamically updating said mapping in response to a request for release of resources.

12. The method of claim 10 further comprising dynamically updating said mapping when more resources become available.

13. The method of claim 10 further comprising dynamically updating at least part of said mapping when tasks are completed.

14. The method of claim 10 further comprising dynamically updating at least part of said mapping when scheduling of more application tasks is needed.

15. The method of claim 10, wherein said schedule further comprises time slice information, and wherein said executing further comprising utilizing said time slice information for switching between tasks of said sub-schedule according to said local logical clock.

16. A program storage device readable by machine, tangibly embodying a program of instructions executable by the machine to perform method steps for providing processor resource allocation among tasks of parallel applications in a computer environment having a gang scheduler and a plurality of nodes each having at least one processor, a local logical clock, and a node level scheduler, said method steps comprising:

receiving application requirement information at said gang scheduler;

utilizing said application requirement information for flexibly creating a schedule at said gang scheduler, said schedule comprising a plurality of sub-schedules of node-specific tasks for each of said plurality of nodes;

transmitting node-specific task information of said plurality of sub-schedules, one to each of said plurality of nodes; and wherein said sub-schedules are implemented at said plurality of nodes.

* * * * *